United States Patent Office 3,487,080
Patented Dec. 30, 1969

3,487,080
METHOD FOR PRODUCING ISOCYANATE TRIMER
Yutaka Matsui, Hyogo, and Jugo Goto, Osaka, Japan, assignors to Takeda Chemical Industries, Ltd., Osaka, Japan
No Drawing. Filed Jan. 18, 1968, Ser. No. 698,729
Claims priority, application Japan, Jan. 19, 1967, 42/3,760
Int. Cl. C07d 55/38; C08g 22/04, 33/02
U.S. Cl. 260—248                    2 Claims

ABSTRACT OF THE DISCLOSURE

Isocyanate trimers are prepared by trimerizing an isocyanate compound in the presence of, as catalyst, a combination of (1) quaternary ammonium hydroxide of the formula

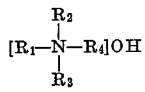

wherein each of $R_1$, $R_2$, $R_3$ and $R_4$ is alkyl or hydroxy alkyl having 1 to 6 carbon atoms, cycloalkyl of 5 to 6 carbon atoms, benzyl or phenyl, or wherein

is pyridinium, and (2) a compound selected from the group consisting of (a) phenol of the formula

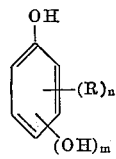

wherein R is halogen, methyl or amino, n is zero, 1, 2 or 3, m is zero or 1, and when m is 1, the two OH groups occupy meta or para positions on the benzene ring, (b) oxime of 2 to 6 carbon atoms, and (c) methanol. The obtained isocyanate trimers are useful for the same purposes as known isocyanate trimers.

---

This invention relates to a method for producing isocyanate trimers in the presence of catalyst and, more concretely, to a method for producing isocyanate trimers, which comprises trimerizing an organic isocyanate, in the presence of a catalyst composition consisting of (1) quaternary ammonium hydroxide and (2) a compound selected from the group consisting of phenol compounds, oximes, and methanol.

It has been known that an isocyanate compound can be trimerized in the presence of catalyst to produce the corresponding isocyanate trimer. Thus-produced isocyanate trimer is useful as a starting material for the preparation of paints, coating agents, adhesive agents, elastomers, plastics, etc. Various kinds of catalyst have heretofore been contrived for the production of isocyanate trimer. However, these known catalysts have rather low catalytic activity, and therefore, must be used in large amount for the production of isocyanate trimer. Moreover, it takes a rather long period of time to complete the trimerization. Thus, the methods using these known catalysts are not satisfactory from an industrial point of view.

It is an object of the present invention to provide novel catalyst compositions for the production of isocyanate trimers. Another object of this invention is to provide an industrially feasible method for producing isocyanate trimers by using the said novel catalyst compositions. According to the method of the present invention, the objective isocyanate trimers can easily be produced in a short time with the use of a small amount of the catalyst composition.

A catalyst composition according to the present invention consists of (a) quaternary ammonium hydroxide and (b) a compound selected from the group consisting of phenols, oximes and methanol.

The quaternary ammonium hydroxide corresponds to the formula:

  (I)

wherein each of $R_1$, $R_2$, $R_3$ and $R_4$ is the same or different, alkyl or hydroxyalkyl radical having from 1 to 6 carbon atoms, cycloalkyl radicals of 5 or 6 carbon atoms, benzyl radical or phenyl radical, including the case where

represents the pyridinium radical. The alkyl radical is exemplified by methyl, ethyl, n-propyl, isopropyl, n-butyl, isobutyl, tertbutyl, n-pentyl, isopentyl, 3-methyl-pentyl, 3,3-dimethylbutyl, n-hexyl, etc.; the cycloalkyl radical is exemplified by cyclopentyl, cyclohexyl; and the hydroxy alkyl radical is exemplified by hydroxyethyl, 1-hydroxypropyl, 1-hydroxy-n-butyl, etc.

Typical compounds included in Formula I are:
(1) tetramethylammonium hydroxide,
(2) tetraethylammonium hydroxide,
(3) trimethylbenzylammonium hydroxide,
(4) trimethylcyclohexylammonium hydroxide,
(5) trimethyl-n-hexylammonium hydroxide,
(6) β-hydroxyethyltrimethylammonium hydroxide,
(7) N-ethylpyridinium hydroxide, etc.

The phenol compounds correspond to the formula:

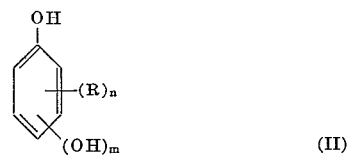  (II)

wherein R is halogen, methyl or amino, n is zero, 1, 2 or 3, m is zero or 1, and when m is 1, the two OH groups occupy meta or para positions on the benzene ring.

The phenol compounds (II) are exemplified by phenol, cresol, resorcin, hydroquinone, o-chlorophenol, m-chlorophenol, p-chlorophenol, 2,4 - dichlorophenol, 2,4,5 - trichlorophenol, o-aminophenol, etc.

The oxime compounds are those having 2 to 6 carbon atoms, and are exemplified by acetoxime, aldoxime, methyl ethyl ketoxime, dimethyl glyoxime, diethyl glyoxime, methylethyl glyoxime, cyclohexanonoxime, etc.

The organic di- or poly-isocyanate compounds of this invention are aromatic isocyanates such as phenylisocyanate, benzylisocyanate, 1-chloro-2,4-phenylene diisocyanate, 1-methoxy-2,4-phenylene diisocyanate, 1-ethoxy-2,4-phenylene diisocyanate, 2,4-tolylene diisocyanate, 2,6-tolylene diisocyanate, phenylene diisocyanate, 4,4' - diphenylmethane diisocyanate (MDI), naphthylene diisocyanate, ω,ω'-diisocyanate dimethylbenzene (XDI), ω,ω'-diisocyanate diethylbenzene, ω,ω'-diisocyanate diethylxylene, dicyclohexylmethane-4,4'-diisocyanate, etc., aliphatic isocyanates such as hexylisocyanate, hexamethylene diisocyanate (HDI), tetramethylene diisocyanate, dichlorohexylmethane-4,4'-diisocyanate, etc. Use is also made of, as isocyanates of this invention, addition products having terminal —NCO groups, which are obtained by reaction between an above-mentioned isocyanate in excess and polyol such as ethylene glycol, propylene glycol, glycerol, hexane triol, trimethylol propane, pentaerythritol, diethylene glycol, dipropylene glycol or other conventional polyether polyol or polyester polyol having rather high molecular weight.

The method of the present invention is carried out by contacting the isocyanate compound with the catalyst composition consisting of (1) quaternary ammonium hydroxide and (2) the phenol, oxime or methanol, at ambient room temperature, under cooling or under heating.

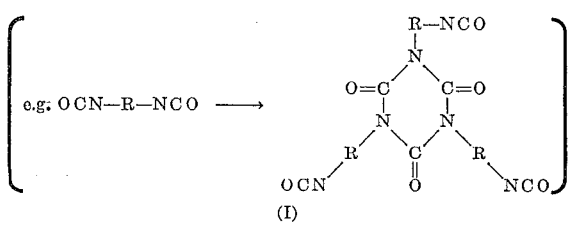

and trimerization of the afore-mentioned trimer (I) concurrently takes place to give cross-linked elastomeric trimer

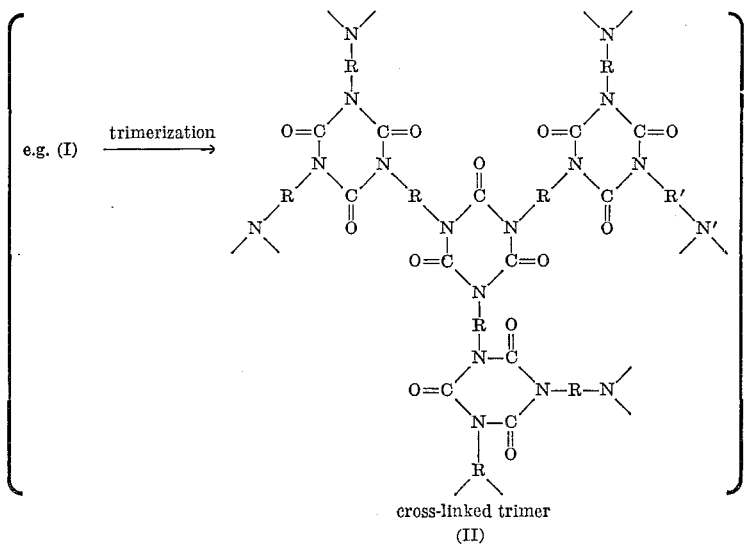

cross-linked trimer
(II)

The temperature is suitably selected in accordance with the isocyanate compound and/or catalyst composition, and usually is from about 0° to about 150° C., more advantageously, from about 0° to about 60° C.

The contact is carried out either in an organic solvent or without any solvent. Solvents which can be used are exemplified by esters (e.g. Cellosolve acetate, ethylacetate, butylacetate, etc.), ketones (acetone, methyl ethyl ketone, methyl isobutyl ketone, etc.), ethers (e.g. ethylether, dioxane, etc.), and aromatic compounds (e.g. benzene, xylene, toluene, etc.).

The amount of the quaternary ammonium hydroxide used is about 0.005 to about 0.5 part, more preferably about 0.01 to about 0.1 part, by weight per 100 parts by weight of organic isocyanate compound, and the phenol, oxime or methanol is used in an amount of about 0.001 to about 5.0 parts, more preferably about 0.01 to about 1.0 part, by weight per 100 parts by weight of organic isocyanate compound.

The ratio of the phenol, oxime or methanol relative to the quaternary ammonium hydroxide is about 5 to about 500 (weight/weight·ratio), more desirably, about 10 to about 50.

The quaternary ammonium hydroxide is advantageously added to the reaction system in a state of solution prepared by dissolving the same in a solvent as above enumerated or in another solvent such as water, methanol, dimethylsulfoxide, dimethylformamide, etc.

In the present method, when monoisocyanate (R—NCO) is used, the corresponding trimer

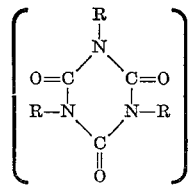

is produced, but when di- or polyisocyanate is used, there is produced the corresponding trimer In the latter case, when only the trimer (I) is desired, a so-called catalyst poison such as benzoyl chloride, phosphoric acid, etc., may be added to the reaction system before gelation occurs, so that the trimerization of the trimer (I) is terminated.

When it is intended by the present method to produce the trimer of so-called addition product having two or more terminal NCO groups which is prepared by a reaction between low molecular di- or polyisocyanate in excess and polyol, the addition product per se can directly be subjected to the trimerization, or the low molecular di- or polyisocyanate in excess and the polyol may separately be added to the reaction system to contact both of them with the catalyst composition.

When the addition of both components is effected separately, besides the trimer (I), cross-linked elastomeric trimer (trimer (III)) having isocyanuric linkages

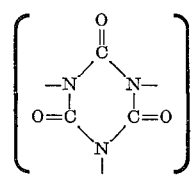

therein is also produced because a urethane formation reaction between the di- or polyisocyanate and the polyol takes place concurrently with the trimerization of the di- or polyisocyanate per set and thus-produced polyurethane having urethane linkage is cross-linked with the trimer (I). In this case also, only the trimer (I) can be obtained by adding the catalyst poison as mentioned above to the reaction system before gelation occurs.

In the present specification and claims throughout, the term "isocyanate trimer" is used as including all the trimers (I), (II) and (III).

The following tests and examples show presently preferred embodiments of this invention but are not intended to be restrictive. It is to be understood that the following examples are solely for the purpose of illustration and not for limitation of this invention, and that variations may be resorted to without departing from the spirit and scope of this invention. In the examples, parts by weight bear the same relation to parts by volume as do grams to milliliters.

As the trimerization of di- or polyisocyanate proceeds, a gelation is observed if no catalyst poison is added to the reaction system. Therefore, the activities of the catalyst composition for trimerizing the isocyanate compound can be determined by measuring the gelation time of the reaction system containing di- or polyisocyanate compounds and the catalyst composition for trimerizing the isocyanate compounds.

Thus the following tests are conducted:

Test 1

Three parts by weight of ethylacetate, 3 parts by weight of tolylene diisocyanate (a mixture of 80 weight percent of 2,4-isomer and 20 weight percent of 2,6-isomer) and a catalyst composition are homogeneously admixed, and the whole mixture is kept standing at room temperature (15° to 30° C.).

The time required for causing gelation of the whole mixture is measured.

The result is summarized in Table 1.

The time required for causing gelation of the whole mixture is determined.

The result is summarized in Table 2.

TABLE 2

| Co-catalyst | Gelation time, seconds |
| --- | --- |
|  | 6,300 |
| Phenol | 30 |
| o-Chlorophenol | 30 |
| m-Chlorophenol | 15 |
| p-Chlorophenol | 15 |
| 2,4-dichlorophenol | 30 |
| 2,4-trichlorophenol | 60 |
| Resorcin | 25 |
| Hydroquinone | 20 |
| o-Aminophenol | 720 |
| Methanol | 60 |
| Acetoxime | 50 |
| Methyl ethyl ketoxime | 125 |
| Dimethyl glyoxime | 720 |

Test 3

With the use of 5 parts by weight of various kinds of isocyanate compounds and various catalyst compositions, the test is carried out in manner similar to that of the preceding tests.

The result is summarized in Table 3.

TABLE 3

| | Catalyst composition | | | | |
| --- | --- | --- | --- | --- | --- |
| | Catalyst | | Co-catalyst | | |
| Compound | Compound | Amount, parts by weight | Compound | Amount, parts by weight | Gelation time, min. |
| Isocyanate: | | | | | |
| MDI | Trimethylbenzyl ammonium hydroxide | 0.005 | p-Chlorophenol | 0.1 | 0.5 |
| MDI | do | 0.005 |  |  | >60 |
| HDI | do | 0.025 | o-Chlorophenol | 0.1 | 94 |
| HDI | do | 0.025 |  |  | >4,320 |
| XDI | do | 0.005 | o-Chlorophenol | 0.1 | 8 |
| TDI | β-Hydroxyethyltrimethyl ammonium hydroxide | 0.005 | do | 0.1 | 5 |
| TDI | do | 0.005 |  |  | >4,320 |
| TDI | Tetraethyl ammonium hydroxide | 0.005 | o-Chlorophenol | 0.1 | 360 |
| TDI | do | 0.005 |  |  | >4,320 |

MDI: 4,4'-diphenylmethanediisocyanate.
HDI: Hexamethylenediisocyanate.
XDI: ω,ω'-Dimethylbenzenediisocyanate.
TDI: Mixture of 2,4-isomer 80 weight percent and 2,6-isomer 20 weight percent.

EXAMPLE 1

Ten parts by weight of benzene, 0.05 part by weight of a Cellosolve acetate solution containing 0.005 part by

TABLE 1

| | Catalyst composition | | | | |
| --- | --- | --- | --- | --- | --- |
| | Catalyst | | Co-catalyst | | |
| | Compound | Amount, parts by weight | Compound | Amount, parts by weight | Gelation time, min. |
| Present invention: | | | | | |
| (1) | Trimethylbenzylammonium hydroxide | 0.0024 | Phenol | 0.15 | 15 |
| (2) | do | 0.0024 |  |  | 150 |
| (3) | 1,4-diazabicyclo-2,2,2-octane | 0.006 |  |  | >1,000 |
| Control: | | | | | |
| (4) | do | 0.006 | Phenol | 0.15 | >1,000 |
| (5) | do | 0.006 | Propylene oxide (molecular weight) | 0.15 | 90 |
| (6) | Calcium naphthenate | 0.006 | Phenol | 0.15 | >1,000 |
| (7) | Lead 2-ethylhexoate | 0.006 | Methanol | 0.15 | >1,000 |

Test 2

Five parts by volume of butylacetate, 0.05 part by volume of a 10% Cellosolve acetate solution containing 0.005 part by weight of trimethylbenzylammonium hydroxide, five parts by weight of tolylene diisocyanate (a mixture of 2,4-isomer 80 weight percent and 2,6-isomer 20 weight percent) and 0.1 part by weight of co-catalyst are homogeneously admixed, and the mixture is kept at 25° C.

weight of trimethylbenzylammonium hydroxide and 0.1 part by weight of p-chlorophenol are homogeneously admixed, and to the mixture is added 10 parts by weight of phenylisocyanate under agitation, whereby exothermic reaction proceeds to give precipitates. After filtration, the precipitates are washed with benzene to yield 9.7 parts by weight of white powder, melting at 274° C.

The white powder is analyzed by IR spectrum to reveal that it shows a significant absorption band at 1910 cm.$^{-1}$, which corresponds to an absorption by isocyanuric linkage, and no significant absorption band at 2250 cm.$^{-1}$, which corresponds to an absorption by isocyanate group, is observed. The result of the analysis by IR spectrum and the melting point of 274° C. proves that the white powder is a trimer of phenylisocyanate.

EXAMPLE 2

90 parts by weight of butyl acetate, 0.008 part by weight of 48% methanol solution of trimethylbenzylammonium hydroxide and 0.5 part by weight of o-chlorophenol are homogeneously admixed, and to the mixture is added 60 parts by weight of tolylene diisocyanate (a mixture of 2,4-isomer 80 weight percent and 2,6-isomer 20 weight percent). The whole mixture is kept at 25° C. with agitation to allow a reaction to take place, while measuring amine equivalent of the reaction mixture.

When the amine equivalent becomes about 700, 0.1 part by weight of phosphoric acid is added to the reaction mixture to terminate the reaction. Thus, viscous liquid having an amine equivalent 728 is obtained.

The liquid is determined as a trimer of tolylene diisocyanate by analysis by IR spectrum. Thus-prepared liquid can be used as an isocyanate component of a so-called two-can-type coating composition.

EXAMPLE 3

2.5 parts by weight of polypropylene glycol (molecular weight 600), 2.5 parts by weight of polypropylene glycol (molecular weight 200), 0.005 part by weight of a 40% methanol solution of trimethylbenzylammonium hydroxide and acetoxime, are homogeneously admixed, followed by degassing under vacuum. To the thus-treated mixture, there is added 3.9 parts by weight of $\omega,\omega'$-diisocyanate dimethylbenzene under stirring, followed by degassing under vacuum. The whole mixture is left standing at room temperature for half an hour to allow a reaction to take place, whereby colorless transparent cured elastomer is produced.

EXAMPLE 4

To a mixture of 306 parts by weight of butyl acetate and 261 parts by weight of tolylene diisocyanate (a mixture of 2,4-isomer 80 weight percent and 2,6-isomer 20 weight percent) there is added 45 parts by weight of 1,3-butylene glycol, and the mixture is heated to 70° C. for 12 hours, followed by cooling to 25° C. To the reaction mixture, there is added a mixture of 2 parts by weight of p-chlorophenol and 0.06 part by weight of a Cellosolve acetate solution containing 0.006 part by weight of trimethylbenzylammonium hydroxide.

The whole mixture is kept at 25° C. with agitation to allow a reaction to take place, while measuring the amine equivalent of the reaction mixture. When the amine equivalent becomes about 614, 0.3 part by weight of benzoylchloride is added to the reaction mixture to terminate the reaction. Thus a highly viscous liquid is obtained.

The product has isocyanuric linkages and urethane linkages in its molecule, and is useful as an isocyanate component of a so-called two-can-type coating composition.

EXAMPLE 5

To a mixture of 134.8 parts by weight of butyl acetate and 34.8 parts by weight of tolylene diisocyanate (a mixture of 2,4-isomer 80 weight percent and 2,6-isomer 20 weight percent) there is added 100 parts by weight of polypropylene glycol (molecular weight of about 2000), and the mixture is heated to 70° C. for 2 hours, followed by cooling to 25° C. To the reaction mixture, there is added a mixture of 1 part by weight of p-chlorophenol and 0.03 part by weight of Cellosolve acetate solution containing 0.003 part by weight of trimethylbenzylammonium hydroxide. The whole mixture is kept at 25° C. with agitation to allow a reaction to take place, while measuring the amine equivalent of the reaction mixture. When the amine equivalent becomes about 1800, 0.14 part by weight of benzoylchloride is added to the reaction mixture to terminate the reaction. Thus, a highly viscous liquid is obtained. The product has isocyanuric linkages and urethane linkages in its molecule, and can be used as a one-component moisture-cure type coating agent.

EXAMPLE 6

A so-called two-can-type coating composition is prepared as follows:

Component A.—100 parts by weight of the liquid prepared according to Example 2.

Component B.—30 parts by weight of polyester dissolved in 50 parts by weight of mixed solvent (ethylacetate:butylacetate:toluene:Cellosolve acetate=1:1:1:1). The polyester is prepared by allowing adipic acid (338 parts by weight), 1,4-butylene glycol (180 parts by weight) and trimethylol propane (268 parts by weight) to react with each other at 200° C. under a nitrogen gas stream.

Upon admixing component A with component B and applying the mixture to a substrate, the latter is provided with a hard coating film.

EXAMPLE 7

100 parts by weight of the product prepared according to Example 4 can be used as one component of a so-called two-can-type coating composition. A second component can be identical with that according to Example 6, except that 35 parts by weight of polyester are employed.

Upon admixing the two components and applying the mixture to a substrate, the latter is provided with a hard coating film.

Having thus disclosed the invention, what is claimed is:

1. In a method for producing isocyanate trimers by trimerizing an isocyanate compound in the presence of catalyst, the improvement according to which the trimerization is carried out in the presence, as catalyst, of a combination of (1) quaternary ammonium hydroxide of the formula

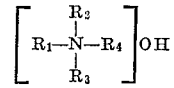

wherein each of $R_1$, $R_2$, $R_3$ and $R_4$ is alkyl or hydroxyl alkyl having 1 to 6 carbon atoms, cycloalkyl of 5 to 6 carbon atoms, benzyl or phenyl, or wherein

is pyridinium and (2) a compound selected from the group consisting of (a) phenol of the formula

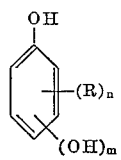

wherein R is halogen, methyl or amino, n is zero, 1, 2 or 3, m is zero or 1, and when m is 1, the two OH groups occupy meta or para positions on the benzene ring, (b) oxime of 2 to 6 carbon atoms, and (c) methanol.

2. An improvement according to claim 1, wherein the quaternary ammonium hydroxide is present in an amount of about 0.005 to about 0.5 part by weight per 100 parts by weight of isocyanate, and the phenol, oxime or methanol is present in an amount of about 0.001 to about 5.0 parts by weight per 100 parts by weight of isocyanate, the ratio of phenol, oxime or methanol relative to the quaternary ammonium hydroxide (weight/weight ratio) being about 5 to about 500.

References Cited

UNITED STATES PATENTS

| | | | |
|---|---|---|---|
| 2,979,485 | 4/1961 | Burkus | 260—248 XR |
| 3,144,452 | 8/1964 | Wild et al. | 260—248 |
| 3,259,625 | 7/1966 | Ugi et al. | 2600—248 |
| 3,330,828 | 7/1967 | Grogler et al. | 260—248 |

HENRY R. JILES, Primary Examiner

J. M. FORD, Assistant Examiner